INVENTOR.
EDWIN L. RULE
BY Townsend and Townsend
ATTORNEYS

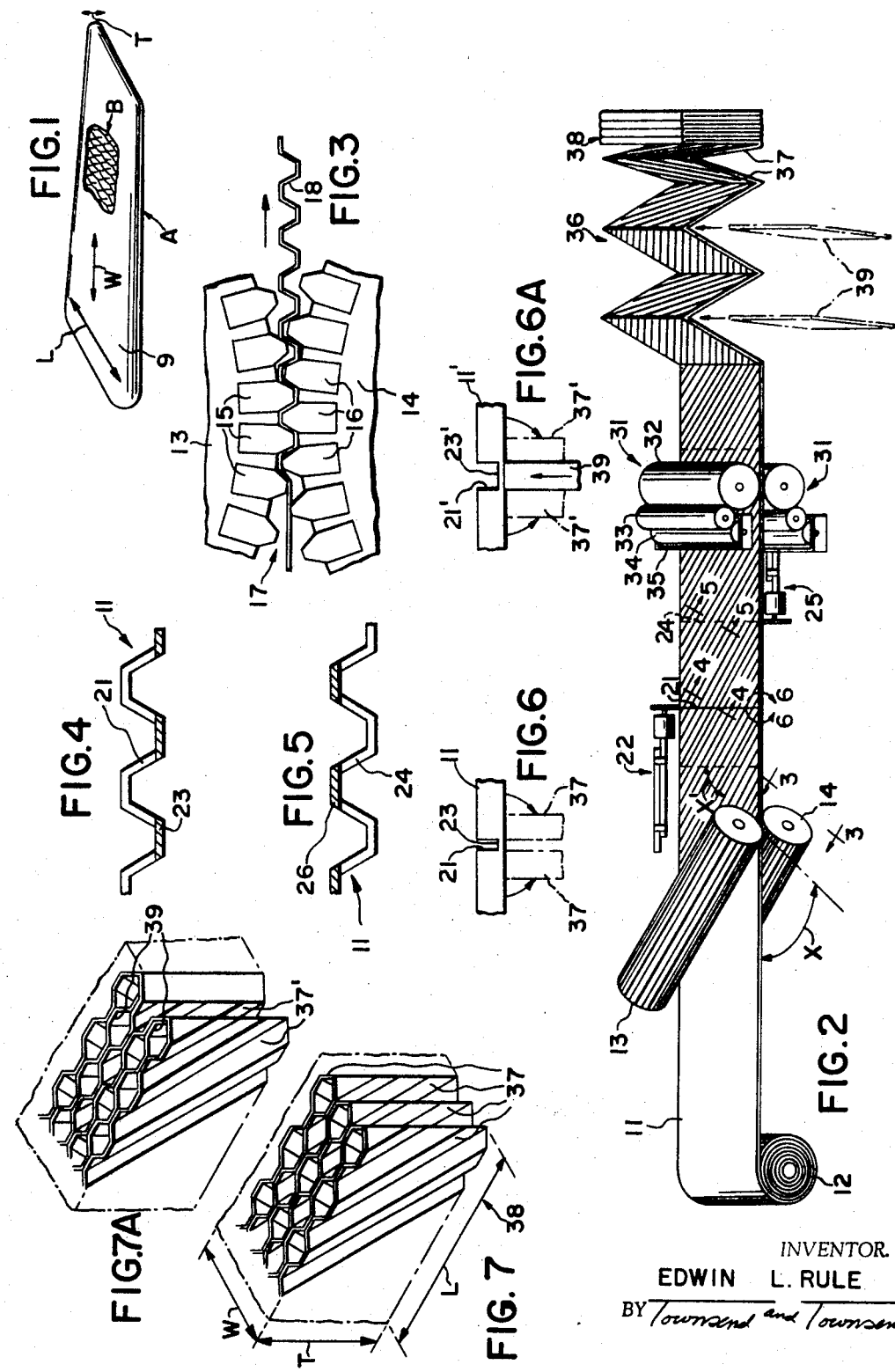

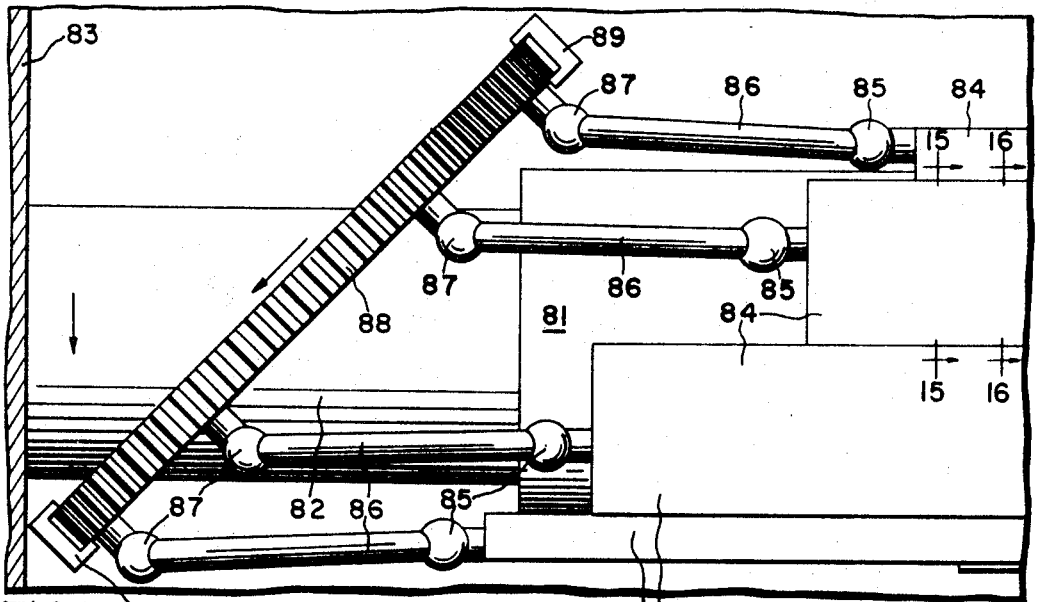
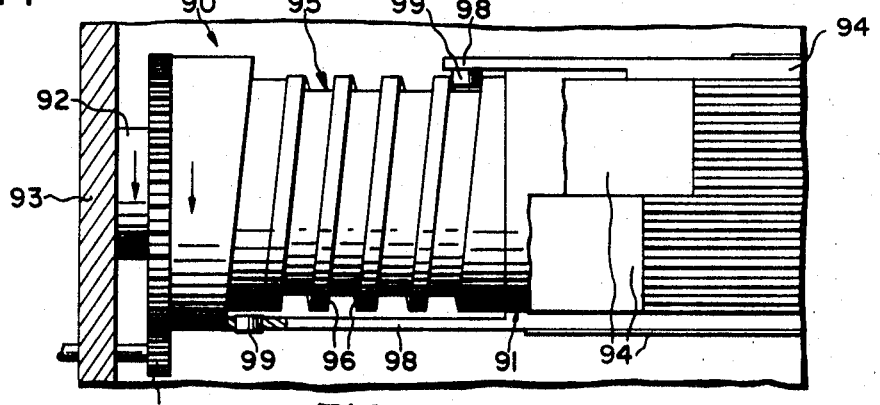
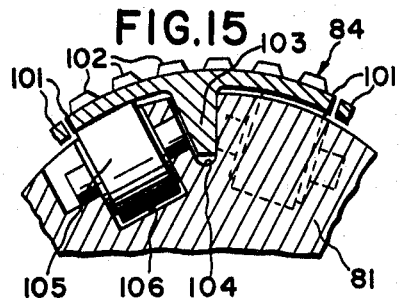 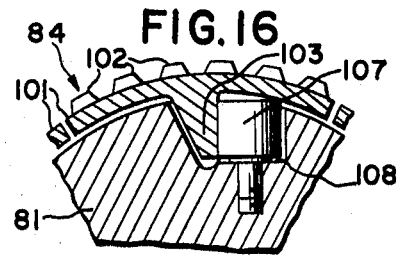

INVENTOR.
EDWIN L. RULE
BY
Townsend and Townsend
ATTORNEYS

United States Patent Office
3,470,053
Patented Sept. 30, 1969

3,470,053
METHOD AND APPARATUS FOR MAKING CORRUGATED MATERIAL STRUCTURE
Edwin L. Rule, Berkeley, Calif., assignor to Hexcel Corporation, Berkeley, Calif., a corporation of California
Filed Feb. 19, 1965, Ser. No. 434,086
Int. Cl. B32f 1/22; B23p 19/04
U.S. Cl. 156—207                                18 Claims

ABSTRACT OF THE DISCLOSURE

An assembly used for producing a series of parallel corrugations in a web of material at a constant angle to a line across the width of the material. The assembly includes a first and second plurality of teeth arranged in parallel relationship, means for supporting the first plurality of teeth to mesh with the second plurality of teeth and provide corrugations in said material as it passes between the meshing teeth, means for driving said teeth into meshing contact and means for maintaining the angle constant by moving the teeth along their length at a rate sufficient to compensate for the displacement of the material during the angular meshing contact with the plurality of teeth. Apparatus is also included for fabricating honeycomb structures that have cellular openings thereof arranged in at least three different directions.

---

The present invention relates in general to a structure formed of corrugated material and the method of making same and particularly to such a structure and method wherein the corrugations are formed across a web of material at an angle with respect to a line across the width of the material.

For many structures, such as, for example, air foils, rotor blades, energy absorbing parts and the like a light weight rigid structure is desired. Many of these structures have been formed from conventional honeycomb material which is made up of a plurality of elongate cells formed in certain cases by joiner of corrugated foils of material. Conventional honeycomb of this nature has a high strength to weight ratio with respect to loading forces that are applied to the cellular walls parallel to the axes of the elongate cells. However, conventional honeycomb is orthotropic; that is, the strength of this material is less when the loading forces are not parallel to the cell axes. Therefore, when conventional honeycomb is utilized to support a given surface, the honeycomb is usually positioned with the cell axes normal to the given surface so that the major loading forces directed normal to the given surface are aligned parallel to the honeycomb cell axes. Naturally, where the surface to be supported has a large curvature as in the case of rotor blades and air foils, the cell axis of conventional honeycomb cannot be everywhere normal to the surface.

In order to overcome the shortcomings of a conventional honeycomb, so called "truss grid" or "cross core" structures have been proposed wherein the core material is made up of successive corrugated foil sheets with the corrugations in adjacent sheets arranged at an angle with respect to one another. Structures formed in this manner have corrugations which run in a number of different directions with respect to the surface of the structure whereby the completed structure is more stable than conventional honeycomb and better able to withstand loading from a number of different directions. An added advantage of cross core structures lies in the fact that they are easier to hold than conventional honeycomb during a carving operation wherein a block of material is cut to produce a complex curvature on one surface.

One way to fabricate cross core structures has been to corrugate web material with the corrugations running perpendicular to the web edge, as is conventional, then to cut smaller sheets from the web and lay these sheets up side by side with the corrugations of adjacent sheets arranged at an angle to one another. This technique of fabrication is not only difficult and time consuming but it is wasteful of web material. Another method of fabricating cross core is described in U.S. Patent No. 3,096,053 to Pajak. In accordance with the Pajak patent, corrugations are provided perpendicularly across a web of material, in conventional manner, and the web is diagonally cut and folded so that an elongate double thickness strip is formed having successive parallelogram shaped regions face to face with corrugations running in the diagonally opposite directions in the face to face regions with a series of ribbon separations along the strip. Many such strips must be placed side by side and secured together to form an elongate structure. With the Pajak construction flexibility in the angular direction of the corrugations is only possible with considerable sacrifice in the flexibility of the thickness of the material formed thereby.

In accordance with the present invention, web material is corrugated with the corrugations arranged at an angle with respect to the width of the material. A continuous length of such a corrugated web of material is cut at desired intervals and folded on itself to form a pack of corrugated sheets of material with the corrugations of adjacent angle corrugated sheets arranged at an angle with respect to one another. With this method, it is possible to continuously run the corrugating, cutting, and folding operation to form a structure of virtually any length and easily to change the angle of the corrugations with respect to the width of the material without a significant sacrifice in the possible dimensions of the core produced thereby. Each of the sheets is continuous without any separations along its length as would reduce the strength of the structure produced thereby.

In the preferred embodiment of the present invention the web of material is alternately cut from opposite sides substantially entirely through the web of material except for the web thickness furthest from the side from which cutting is initiated. Then the web is folded at the cuts alternately in opposite directions at successive cuts so that adjacent corrugated panels in the final pack of corrugated material lie with faces in contact with one another without binding or collapsing the corrugations at the edge of the core material near where cuts have been made.

Additionally, in accordance with the present invention the width of at least certain of the cuts can be sufficient to allow folding of the web material around an additional panel or corrugated material without collapsing either the corrugations in the web or in the additional panel. In this way an additional panel having corrugations aligned with its width can be inserted between two diagonally corrugated panels from the diagonally corrugated web thereby to provide a core structure which has panels with the corrugations thereof arranged in three or more different directions.

In accordance with this invention, corrugations are produced diagonally across the web material by moving those corrugating teeth on corrugation rolls and in contact with the web longitudinally as they are rotated by the corrugating rolls to corrugate web material therebetween. This construction and method permits the web material to feed into the meshing region of the teeth of corrugating rollers with the edge of the web at an angle hereinafter designated X, with respect to the normal driven direction due only to rotation of the corrugating rollers without causing the web of material to be driven out from between the ends of the corrugating rollers during the corrugating process. With the web fed into the corrugation rollers at the feed angle X corrugations are formed in the web with the length of each corrugation arranged at an angle X' with respect to a line across the width of the web differing from the angle X due to the metal flow in the mesh region.

As long as the rotational speed $S_r$ of the teeth in the driven direction is related to the axial moving speed $S_t$ of the teeth by the relation $S_t = S_r \tan X$, the web of material remains between the meshing corrugating rollers.

The teeth of the corrugating rollers can be returned to their initial position during the remainder of their rotation outside of the meshing region in which the teeth contact the web so that when again reaching the meshing region they can be moved longitudinally to maintain the webs being corrugated between the corrugating rollers.

In the preferred construction of the corrugating rollers, the longitudinally moving teeth are retained in the slots in the corrugating rollers by retaining rings and moved longitudinally along their axes by the action of a cam surface. Means are provided for changing the cam surface to permit production of corrugations at different angles with respect to the width of the web material.

By utilizing the present invention cross core which is relatively isotropic is produced, and the cross core is produced to a desired configuration in a continuous operation.

Still another feature of the present invention is to provision of a moving cam surface for longitudinally moving the corrugating teeth. This construction reduces the friction in the tooth drive assembly.

An additional feature of the present invention is the provision of a device for detecting the track of the web material through the corrugating assembly and means such as, for example, an adjustable cam for changing the axial speed of the corrugating teeth in response to the detected web track to maintain a desired web track through the corrugating assembly.

Other objects of the present invention will become apparent upon reading the following specification and referring to the accompaying drawings in which similar characters of reference represent corresponding parts in each of the several views.

In the drawings:

FIGURE 1 is a perspective view of a wing structure where a cross core structure in accordance with this invention is utilized;

FIGURE 2 is a diagrammatic view illustrating the steps performed in forming a cross core structure in accordance with the present invention;

FIGURE 3 is an enlarged view illustrating the corrugating regions of the forming process illustrated in FIGURE 2 taken along line 3—3;

FIGURE 4 is a cross sectional view of the top cut portion of the corrugated web material illustrated in FIGURE 2 taken along line 4—4 in the direction of the arrows;

FIGURE 5 is a cross sectional view of the bottom cut portion of the corrugated web material illustrated in FIGURE 2 taken along line 5—5 in the direction of the arrows;

FIGURE 6 is an enlarged side elevational view of a top cut portion of the corrugated web material illustrating in phantom the position of the corrugated material after folding;

FIGURE 6A is a view similar to FIGURE 6 illustrating an alternative embodiment of the present invention;

FIGURE 7 is a perspective view of a cross core structure formed in accordance with the present invention;

FIGURE 7A is a view similar to FIGURE 7 illustrating an atlernative embodiment of the present invention;

FIGURES 13A, 13B and 13C are enlarged wiews illustrating alternative cam structures for the assembly shown in FIGURE 12;

FIGURE 14 is a plan view, partially broken away, similar to a portion of FIGURE 8 but illustrating an alternative embodiment of the present invention;

FIGURE 15 is a cross sectional view of a portion of the structure shown in FIGURE 14 taken along the 15—15 in the direction of the arrows;

FIGURE 16 is a cross sectional view of a portion of the structure shown in FIGURE 14 taken along line 16—16 in the direction of the arrows;

FIGURE 17 is a plan view partially broken away of still another alternative embodiment of the present invention;

Figure 8:
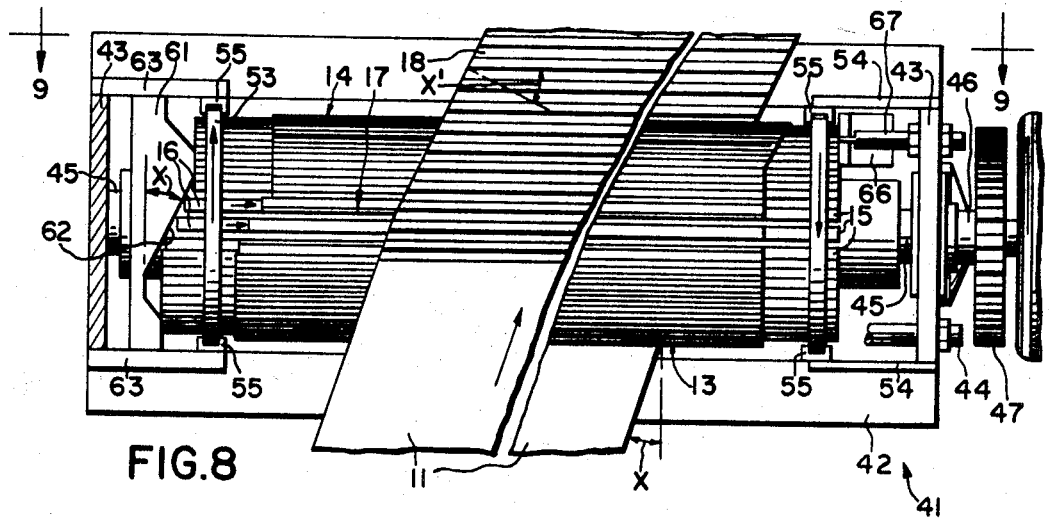
FIGURE 8 is a top view, partially broken away in the region between corrugating rollers, of the corrugating roller assembly in accordance with the present invention.

FIGURE 1 is a perspective view of a wing A structure partially broken away to show the utilization of a cross core structure B in accordance with the present invention for supporting the surface sheets or skins 9 of the wing A. In FIGURE 1 the typical general orientation of the dimensions of the cross core structure are illustrated. The thickness T of the cross core is oriented in the same direction as the thickness of the wing, the length L of the cross core in the same direction as the width of the wing and the width W of the cross core in the same direction as the length of the wing. While the cross core can be otherwise oriented, the orientation illustrated provides the desired support for the large curvature surface of the wing A.

FIGURE 2 is a diagrammatic view illustrating the method and apparatus for producing transverse corrugation in web material and the formation of the cross core or truss grid structure B therefrom.

As illustrated, a web 11 of material such as, for example, aluminum is fed from a roll 12 between corrugating rollers 13 and 14 at a feed angle X with respect to the motion between rollers 13 and 14 due only to the rotation thereof. The corrugating rollers 13 and 14 are provided with corrugating teeth 15 and 16 which mesh in a region 17 between the rollers 13 and 14 to produce transverse corrugations 18 across the width of the web material 11. During corrugation the teeth in the mesh region 17 are moved axially of the rollers 13 and 14 thereby preventing the web of material from "walking" out between the ends of the corrugating rollers 13 and 14 as will be described in greater detail below. Naturally, the corrugating teeth contact the web of material before the teeth of rollers 13 and 14 actually mesh with one another. Therefore, in the preferred embodiment of the present invention the teeth 15 and 16 are moved axially of the rollers when initial contact is established between the teeth and the web material, and the term "mesh region"

is used hereinafter to include the region where the corrugating teeth first clamp the web of material therebetween even though the teeth are not actually meshing.

Since the nature of the metal flow into the mesh region is normal to the elements of the corrugating teeth regardless of the angle X of the web entry, the egress angle X′ becomes proportionally greater as the feed angle X becomes greater. From the known characteristics of the corrugating rolls the relationship of X to X′ is known so that in order to establish corrugations at a given angle X′ the desired feed angle X can be determined and used. By way of example for one corrugating assembly for perfect hexagonal corrugations the relationship of X to X′ is as follows:

$$\tan X = .75 \tan X'$$

Therefore, to achieve corrugations at 45° the feed angle is maintained at 36.9°.

While the corrugating rolls 13 and 14 serve a driving function as well as a corrugating function, in practice drive rollers (not shown) are often used in contact with the web material ahead of and after the corrugating rollers to maintain the web material passing through the corrugating rollers aligned at the desired feed angle X.

The corrugated web of material is cut across its width at equally spaced intervals first with a top cut 21 by means of a top traveling saw assembly 22 which moves a saw blade with the traveling web at the same speed during the cutting operation and a bottom cut 24 by means of a similar bottom traveling saw assembly 25. The top cut 21 is made through the corrugated web of material from the top side to the lower node portions leaving the thickness of the bottom node portion 23 uncut. Similarly, the bottom cut is taken from the bottom surface of the corrugated material up to adjacent the top of the corrugated web material leaving the thickness of the top nodes 26 uncut for folding the web material as described below. Naturally, it is possible to produce other type structures by forming the cuts 21 and 24 other than directly across the width of the web of material.

The outside surfaces of the corrugated web material are coated with a bonding material such as, for example, an adhesive by application assemblies 31. The application assemblies 31 include an applicator roller 32 in contact with nodes at one outside surface of the corrugated material, a transfer roll 33 in rolling contact with the surface of the applicator roll 32 and a pick up roller in rolling contact with the transfer roller 33 and partially immersed in a container 35 of adhesive. Naturally, the adhesive application assemblies 31 can be positioned ahead of the cutting assemblies, but if positioned thereafter, collection of adhesive on the cutting blade of the cutting assembly is avoided.

The adhesive coated, partially cut, corrugated material is accordian folded in a folding assembly 36 wherein the web is caused to fold at the cuts 21 and 24 such as, for example, by pressure from narrow rollers (not shown) to sub-divide the web of material into adjacent panels 37 extending between cuts 21 and 24. The adjacent panels are pressed together to form a folded pack 38 in which the corrugations of adjacent panels 37 are aligned at angles with respect to one another as illustrated in FIGURE 7. Since the corrugations of each of two adjacent panels are arranged at the angle X′ with respect to the normal to their edges, they are positioned at an angle of 2X′ with respect to one another. Thus, if the angle X′ is 45° the corrugations of adjacent panels are normal to one another.

As shown in FIGURE 6 the width of cut 21 is sufficient to permit adjacent panels to fold against one another without collapse of the corrugations adjacent the fold.

In accordance with an alternative embodiment of the present invention the top and/or bottom cut can be made sufficiently wide to accommodate an additional sheets of corrugated material between the adjacent panels 37. Thus, as illustrated in phantom in FIGURE 2 and in FIGURE 6A the cuts, such as top cut 21′, are of such a width as to permit folding of adjacent panels 37′ of web 11′ around an additional corrugated panel 39 such as inserted from the bottom without crushing the corrugations of either of the panels 37′ or the additional panel 39. The additional panels 39 are preferably corrugated panels with their corrugations running substantially transversely thereof as contrasted with panels 37′ which are corrugated at an angle with respect to a line transversely thereof. These panels 39 can be cut from the end of a corrugated web of material that is corrugated in conventional manner or in accordance with this invention.

As shown in FIGURE 7A the completed folded pack of corrugated material formed with additional panels inserted from below has sets of three successive corrugated panels therein with the corrugations in each of the three panels positioned at a different angle with respect to a plane covering the top of the pack to provide a core material which is better able to withstand compressional forces from a variety of directions. Naturally, additional sheets 39 can be inserted from above so that there are normally corrugated panels positioned between every successive pair of panels 37 along the width W of the pack instead of between pairs of panels 37.

While the invention has been described with respect to equally spaced cuts made along the top and bottom of the panel, the spacing of these cuts can be programmed such as, for example, to produce a folded pack of panels of decreasing length L so as to better conform to the configuration of an air foil to be made from the folded pack.

For a more detailed description of an angle corrugating operation reference is made to FIGURES 8–11 wherein the corrugating assembly is illustrated including a frame 41 made up of a base member 42 and side uprights 43 held apart by spacer rods 44. The corrugation rollers 13 and 14 are horizontally mounted in the frame with reduced diameter roller ends 45 journal mounted in the side uprights 43. At one side of the frame 41 the roller ends 45 are provided with extensions 46 passing through the side uprights 43 and on the end of which are mounted identical matching gears 47. One of the gears 47 is driven by a drive shaft 48 from a power drive (not shown) for driving the corrugating rollers 13 and 14 in unison.

Each of the rollers 13 and 14 is provided with a plurality of longitudinally extending grooves 51 equally spaced around its periphery for receiving the teeth of the rollers. The roller teeth 15 and 16 are provided adjacent their ends with machined flat end portions 52 which are machined on a radius of the roller so that a ring 53 may be slid over the machined portions 52 of the teeth to retain the teeth in grooves 51. The inside diameter of the ring 53 is selected for holding the teeth in the grooves 51 while permitting the teeth to move longitudinally of the rollers.

The side uprights 43 are provided with brackets 54 on opposite sides of each of the rollers and on which are fixedly secured ring guides 55 which engage the rings 53 and prevent ring movement axially of the rollers.

In accordance with this invention the teeth in the meshing region 17 are moved longitudinally of the rollers and inside the rings 53 so as to move the web of material 11 longitudinally of the rollers as it passes therethrough. The longitudinal speed $S_t$ of the teeth in the meshing region is related to the feed angle X of the web material by the relationship:

$$S_t = S_r \tan X$$

where $S_r$ is the rotational speed of the teeth due only to rotation of the rollers. Longitudinal movement of the teeth with respect to the rollers can be accomplished in a number of different ways as described below.

Figure 9:
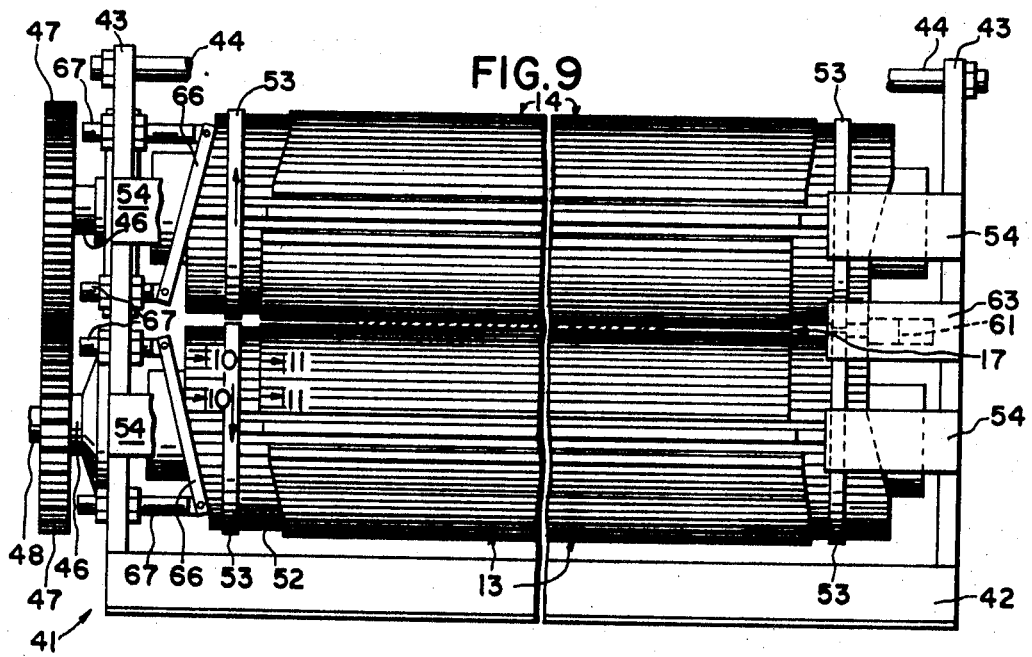
Figure 10:
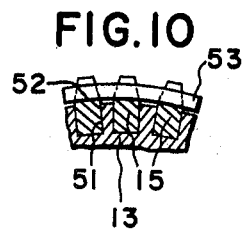
FIGURE 10 is a sectional view of a portion of the structure shown in FIGURE 9 taken along line 10—10 in the direction of the arrows.
Figure 11:
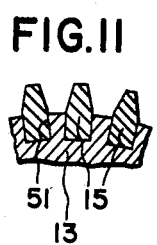
FIGURE 11 is a sectional view of a portion of the structure shown in FIGURE 9 taken along line 11—11 in the direction of the arrows.

As shown in FIGURES 8 and 9 a plate cam 61 having a cam surface 62 is supported by cam guides 63 mounted on the side uprights 43 for positioning the cam surface 62 in the meshing region 17 between the two rollers 13 and 14. The height of the cam surface 62 is sufficient to contact the ends of the teeth 15 and 16 of the rollers 13 and 14 respectively in the mesh region 17 to cause the teeth to move longitudinally of the rollers as the rollers rotate. This plate cam 61 is removable from the cam guides 63 for replacement with other plate cams having different angles of inclination for the cam surface 62 to provide for different corrugation angles X'.

In order to return the teeth to their initial position for reactuation by the cam surface 62, tooth slide bars 66 mounted on jack screws 67 are supported from the side uprights 43 in a region spaced around the circumference of the corrugation rollers from the mesh region 17.

Figure 12:
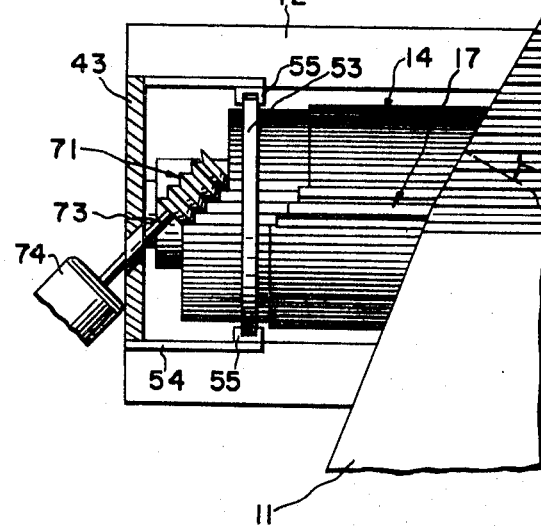
FIGURE 12 is a top view partially broken away, similar to a portion of the structure shown in FIGURE 8 but illustrating an alternative construction for moving the corrugating teeth.

Referring now to FIGURES 12 and 13 there is illustrated an alternative cam surface structure for moving the teeth 52 longitudinally of the rollers 13 and 14 in the mesh region 17. The tooth driving means includes a cam screw 71 having a worm cam surface 72 which contacts the ends of the teeth 52 for driving the teeth longitudinally of the corrugating roller upon rotation of the cam screw 71. The cam screw 71 is mounted on the end of a cam spindle 73 driven by a cam drive schematically illustrated as 74. Typically, the cam drive 74 is linked through gears with the drive gears for the corrugating rollers.

Figure 13A:
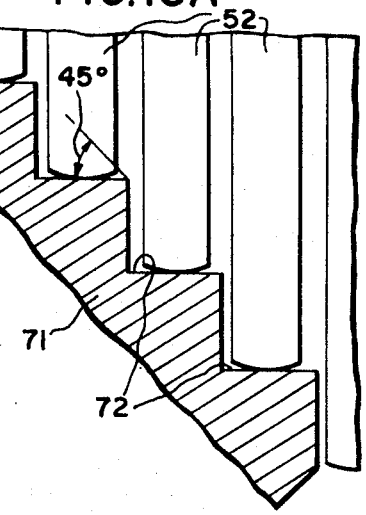
FIGURES 13A, 13B and 13C are enlarged views illustrated in FIGURE 8 taken along line 9—9 in the direction of the arrows.
Figure 13B:
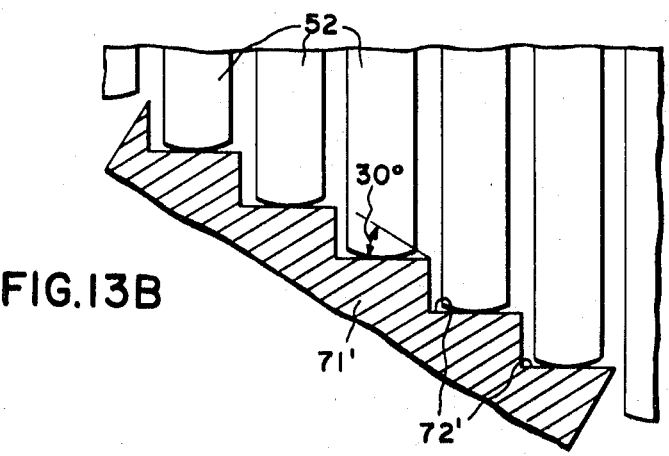
Figure 13C:
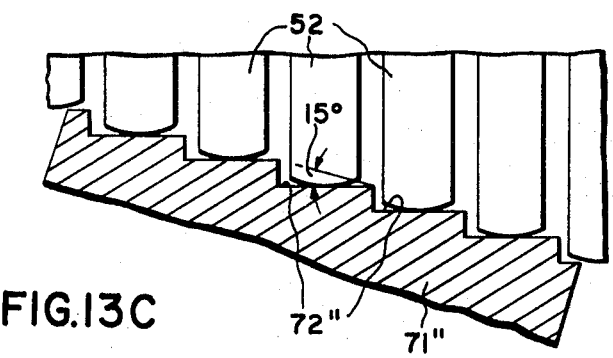

For changing the feed angle X the cam screw 71 having a 45° pitch as shown in FIGURE 13A can be replaced on the end of the cam spindle 73 by a cam screw with a different pitch worm such as a 30° pitch or a 15° pitch worm as shown in FIGURES 13B and 13C respectively.

An alternative arrangement for tooth drive is one in which control is maintained on a tooth segment which includes a plurality of teeth. As illustrated in FIGURES 14–16 a number of toothed segments 84 are provided around the periphery of the corrugating rollers 81 with each of the toothed segments 84 mounted for longitudinal movement on the corrugating rollers 81 and including a plurality of teeth. The toothed segment 84 includes a curved plate portion 101 provided with corrugating teeth 102 on the exterior surfaces thereof and an interior guiding stem 103 slidably supported in a groove 104 of the roller 81. The toothed segment 84 is mounted for easy rolling longitudinally of the corrugating roller 81 by means of cordwise rollers 105 rotatably mounted in recesses 106 in the roller 81 on either side of the groove 104 for rolling contact with the interior of the plate portion 101 and by radial rollers 107 rotatably mounted in recesses 108 for rolling contact with the guiding stem 103. The toothed segment 84 is retained in the groove 104 and against the rollers 105 and 107 by rings similar to rings 53 described with reference to the structure shown in FIGURES 8 and 9 but removed from the assembly illustrated in FIGURES 15 and 16 in order to better illustrate the teeth 102.

Each of the toothed segments 84 is actuated for longitudinal movement with respect to the corrugating roller 81 by connection through a joint 85, to a link 86 and thence through a joint 87 to a rotating ring or spider 88 which is rotatably mounted on the machine support via ring guide 89. By rotating the ring 88 such as by a spur gear (not shown) with one ring revolution for every revolution of the corrugating roller longitudinal movement of the toothed segments 84 is positively controlled for maintaining the web of material being corrugated between the corrugating rollers.

FIGURE 17 illustrates an alternative actuating assembly 90 for toothed segments 94. The actuating means includes a roller 91 which has reduced end portions 92 for journal mounting in a frame 93 and which is provided with means for slidably mounting the toothed segments 94 such as described above with reference to FIGURES 15 and 16. A concentric helical barrel cam 95 having cam surfaces 96 is rotatably mounted at the end of the roller 91 and is driven such as by a spur gear 97. Each of the toothed segments 94 is provided with an extension arm 98 which projects above the barrel cam 95 and includes a cam follower 99 movable through the extension arm into engagement with the helical cam surface 96. Each of the cam followers 99 is actuated by a follower actuation assembly (not shown) in the region just outside the mesh region 15 between the rollers whereby the cam follower 99 is engaged with the cam surface 96. With the barrel cam 95 rotating faster than the roller 91 the toothed segment 94 is moved longitudinally of the roller 91 while in the mesh region. The last thread of the barrel cam has a progressively increasing diameter for moving the cam follower 99 out of contact with the cam surface 96 for return to initial position by a return assembly (not shown). Alternatively the extension arm 98 can be rotatable to disengage the cam follower 99. This drive mechanism 90 is adjusted for different feed angles X by changing the relative speeds of the roller 91 and the barrel cam 95 and thereby provides absolutely uniform motion to the corrugation teeth throughout a continuous feed angle adjustment range.

Figure 18:
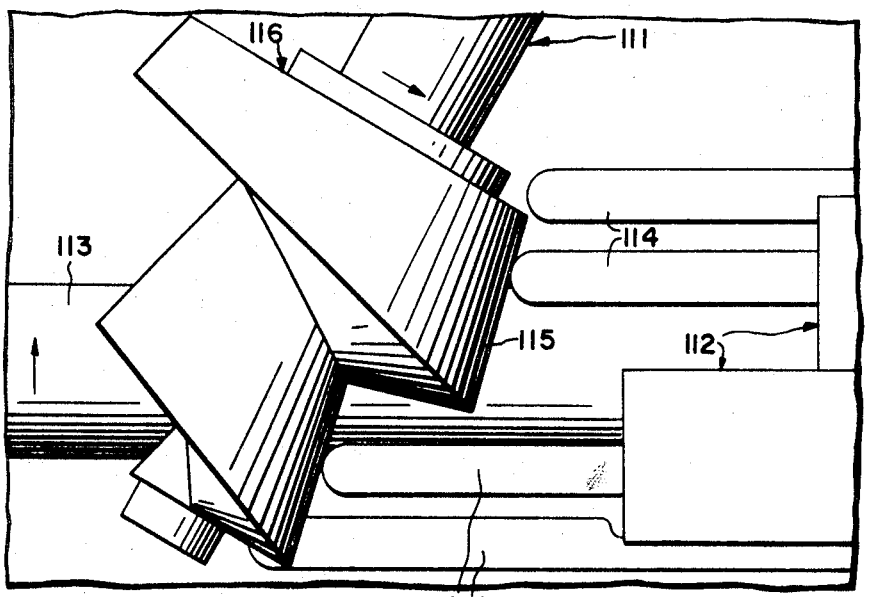
FIGURE 18 is an enlarged plan view of still another alternative embodiment of the present invention.

FIGURE 18 illustrates still another drive assembly 111 for imparting longitudinal movement of toothed segments 112 during rotation of the corrugating roller 113 on which the toothed segments 112 are mounted such as in the manner described above with reference to FIGURES 15 and 16. Each of the toothed segments 112 has an extension arm 114 the end of which is moved by a cam surface 115 on a rotating, three dimensional, spiral cam 116. Variation of the angle between the axis of cam 116 and the axis of roller 113 permits angle corrugations at different feed angles X.

The present invention also contemplates the use of an automatic web tracking mechanism in combination with the possible variations in the feed angle such as by variation of the angle between the axis of cam 116 and the axis of roller 113 as described above. Thus, the track of the web material through the corrugating assembly can be detected with web tracking devices as are commercially available and the axial speed of the corrugating teeth adjusted accordingly such as by variation of the cam surface to maintain a desired web track through the corrugating assembly. For this purpose instead of changing the axis of the cam 116, a straight cam surface such as illustrated in FIGURES 8 and 9 can be hinged from a fixed pivot point, and the pitch of the cam surface changed such as by a hydraulic cylinder in response to the web track sensing head thereby to maintain the track of the web material as desired.

Figure 20:
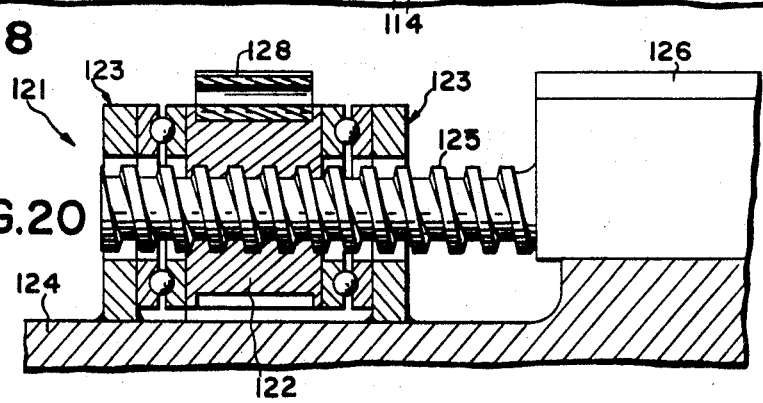
FIGURE 20 is an enlarged section view of a portion of the structure shown in FIGURE 19, taken along line 20—20 in the direction of the arrows.
Figure 19:
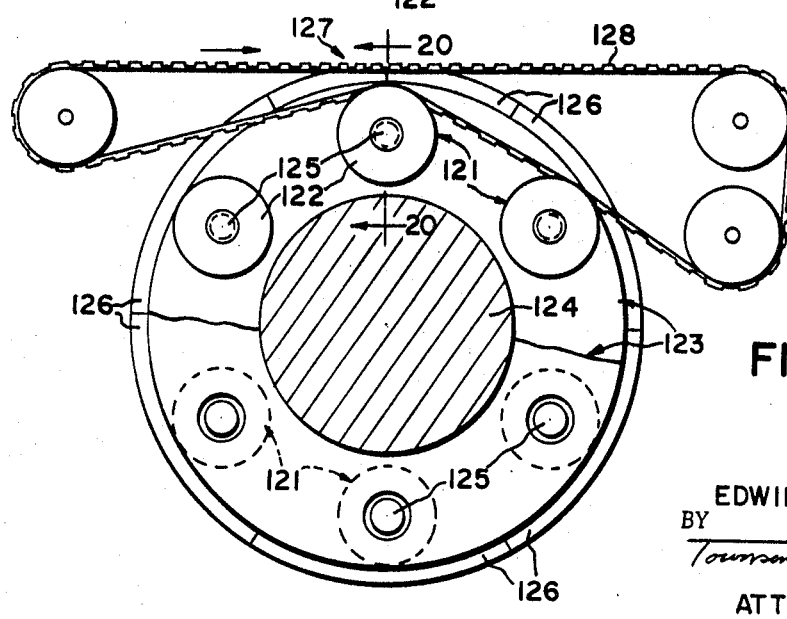
FIGURE 19 is an end view, partially broken away, of still another embodiment of the corrugation tooth drive in accordance with the present invention.

Still another alternative corrugating tooth drive assembly 121 is illustrated in FIGURES 19 and 20 which shows individual rotatable screw member 122 mounted in a bearing and bracket assembly 123 on the corrugating roller 124 and engaging a threaded extension 125 of a particular toothed segment 126. The screw members 126 in the mesh region 127 are rotated by a timing belt 128 to produce longitudinal movement of the corrugating toothed segments 126. A friction wheel (not shown) returns the toothed segments 126 to start position. Variation in the relative speeds of the corrugating rollers 124 and the timing belt 128 produces a variation in the feed angle.

Although the foregoing invention has been described in some detail by way of illustration and example for purposes of clarity and understanding, it is understood that certain modifications may be practiced within the spirit of the invention.

I claim:

1. The method of constructing a core unit of the crosscore type comprising the steps of: corrugating a web of material with corrugations aligned at an angle with respect to a line across the width of the material; cutting the corrugated web of material substantially along lines across the width thereof alternately from opposite faces of the material at spaced apart intervals and through all thicknesses of the corrugated material except the thickness of the web material furthest from the face of the material at which the cut is initiated to define panels with corrugations running at an angle with respect to the width thereof; and accordion folding the corrugated material at such cuts into block form with adjacent angle corrugated sheets making up the block having corrugations running at an angle with respect to each other.

2. The method in accordance with claim 1 wherein said cutting step includes cutting away said web material at at least certain cutting positions sufficiently to accommodate the width of an additional panel member between the angle corrugated panels on opposite sides of such certain cutting positions and including the step of inserting such an additional panel member between adjacent angle corrugated panels at such certain cutting positions with the additionally inserted panel member having corrugations extending thereacross substantially parallel with the width thereof.

3. The method of corrugating a web material comprising the steps of: directing a web of material to a corrugating means including elongate deforming members with the edge of the web material arranged at an angle with respect to a plane normal to the length of said deforming members; moving the web of material into engagement with the deforming members; and simultaneously driving said deforing members in two mutually perpendicular directions, both of which are arranged at an angle to said feeding direction of said material whereby through the movement of said deforming means resulting from driving said deforming members in said two mutually perpendicular directions, said web material is corrugated at the angle from which said web material is directed into said deforming members.

4. A web corrugating assembly for producing corrugations in a web of material at an angle with respect to a line across the width of the material comprising: first and second series of elongate corrugating teeth; means for supporting said series of teeth with the teeth of said first series meshing with the teeth of said second series at a given region to produce corrugations in a web material lying between said series at such region; means for driving said series of teeth in unison to drive and corrugate the web material therebetween at such region; and means for moving the teeth at such region along their length in a direction substantially normal to the driven direction at such region so that web material introduced between said series of teeth at such region with the edge of such material positioned at a given angle with respect to the driven direction of said teeth is corrugated with corrugations running at an angle to the line across the width of the web material.

5. A web corrugating assembly for producing corrugations in a web material at an angle with respect to a line across the width of the material comprising: first and second series of elongate corrugating teeth, the teeth of each of said series being spaced apart by equal distances and all of said teeth having their axes arranged parallel to one another; means for supporting said series of teeth with the teeth of said first series meshing with the teeth of said second series at a given region to produce corrugations in a web material lying between said series at such region, said corrugations being aligned with the axes of said teeth; means for driving said series of teeth in unison in a direction substantially normal to the axes of said teeth to drive and corrugate the web material therebetween at such region; and means for moving the teeth of said series at such position along their axes and substantially normal to the driven direction at such region, adjacent teeth of said first and second series moving together so that web material introduced between said first and second series at such position with the edge of the web material arranged at a given angle with respect to said driven direction of said teeth is corrugated with corrugations running at an angle to a line across the width of the web material.

6. The web corrugating assembly in accordance with claim 5 characterized further in that said supporting means includes a pair of rollers mounted closely spaced apart with their longitudinal axes parallel and each provided with means for mounting one of said series of teeth around the periphery thereof.

7. The web corrugating assembly in accordance with claim 5 characterized further in that said supporting means includes a pair of rollers mounted closely spaced apart with their longitudinal axes parallel and each provided with longitudinal grooves therein equally spaced around the circumference of the roller for slidably supporting teeth therein.

8. The web corrugating assembly of claim 7 including means at each end of each of said rollers for holding said teeth in said longitudinal grooves including a ring surrounding said roller, the interior diameter of said ring being such that said teeth are held in said grooves but can move longitudinally of said roller within said ring, and means for restraining said ring against movement longitudinally of said roller.

9. The apparatus of claim 5 wherein said means for axially moving said teeth includes a cam surface engaging a cam follower connected to said teeth to cause said teeth to move axially in said region and means out of such region for axially returning said teeth to initial position.

10. The apparatus of claim 9 including means for detecting the track of said web material through said web corrugating assembly and means responsive to said detecting means for adjusting the pitch of said cam surface thereby to maintain a desired web track through said corrugating assembly.

11. The web corrugating assembly in accordance with claim 5 and further characterized by means for adjusting the rotational speed $S_r$ of said teeth in said driven direction to be related to the axial moving speed $S_t$ in said teeth in said moving direction by the expression $S_t = S_r \tan X$, wherein X is said given angle.

12. A web corrugating assembly for producing corrugations in a web of material at a given angle with respect to the width of the material, comprising: a pair of corrugating rollers; a plurality of corrugating teeth spaced around the periphery of each of said rollers; means for slideably mounting said teeth in said rollers for movement of said teeth axially of said rollers; means for supporting said pair of rollers with their longitudinal axes parallel and with the rollers closely spaced apart in a region running the length of said rollers, the teeth of one of said rollers meshing with the teeth of the other of said rollers in said region; means for rotating said corrugating rollers in unison; and means for moving the teeth of both of said corrugating rollers in said region longitudinally of the rollers.

13. The web corrugating assembly of claim 12 characterized further in that said means for moving the teeth longitudinally of said rollers in said region includes a cam surface engaging a cam follower connected to said teeth for moving said teeth axially in one direction and including means outside said region for moving said teeth in a direction opposite to said one axial direction to return the teeth to their initial position before again entering said region.

14. Apparatus for producing a cross core structure comprising: means for corrugating a web of material at an angle with respect to the width of the material; means for cutting the corrugated web of material alternately from opposite faces of the material at spaced apart intervals with the cut being made through all web thicknesses except the thickness furthermost from the face of the material at which the cut is initiated; means for applying an adhesive to the web material, and means for alternately folding the cut web material in opposite directions away from respective cuts to compress the web material into block form with alternate panels making up the block having corrugations aligned at an angle with respect to each other.

15. Apparatus for producing a cross core structure comprising a pair of corrugating rollers; corrugating teeth spaced around the periphery of each of said rollers; means for slideably mounting said teeth in said rollers for movement of said teeth axially of said rollers; means for supporting said pair of rollers with their longitudinal axes parallel and with the rollers closely spaced apart in a region running the length of said rollers, the teeth of one of said rollers meshing with the teeth of the other of said rollers in said region; means for rotating said corrugating rollers in unison; means for feeding a web of material to said region at a given angle with respect to a plane normal to the axes of said rollers; means for moving the teeth of both of said corrugating rollers in said region longitudinally of the rollers so that the web material fed between said rollers at such region is corrugated with corrugations running at an angle to a line across the width of the web material; means for cutting the corrugated web of material alternately from opposite faces of the material at spaced apart intervals with the cut being made through all web thicknesses except the thickness furthermost from the face of the material at which the cut is initiated; means for applying an adhesive to the web material, and means for alternately folding the cut web material in opposite directions to compress the web material into block form with alternate panels making up the block having corrugations aligned at an angle with respect to each other.

16. An assembly for continuously producing corrugations in an elongated web of material at an angle with respect to a line across the width of the material, comprising: first and second series of elongate corrugating teeth; means for supporting both said series of teeth with the teeth of said first series meshing with the teeth of said second series at a given region to produce corrugations in that portion of said web of material lying between said series at said region; means attached to said supporting means for driving both said series of teeth in unison relative to said web of material to move said web in a first direction for producing corrugations at said angle in the material at said region; and means associated with said driving means for moving both said series of teeth in a direction along their length at a rate sufficient to maintain the movement of said web of material in said first direction.

17. An assembly for continuously producing corrugations in an elongated web of material at an angle with respect to a line across the width of the material, comprising: first and second series of elongate corrugating teeth; means for supporting both said series of teeth with the teeth of said first series meshing with the teeth of said second series at a given region to produce corrugations in that portion of said web of material lying between said series at said region; means attached to said supporting means for driving both said series of teeth in unison relative to said web of material to move said web in a first direction for producing corrugations at said angle in the material at said region; and means associated with said driving means for moving both said series of teeth in a direction along their length a preselected distance, said means being adjustable to vary said distance to maintain the movement of said web of material along said first direction.

18. An assembly in accordance with claim 17 and further characterized in that said means for moving said teeth includes a cam surface engaging a cam follower connected to said teeth so that said teeth will be moved axially said pre-selected distance and including means for moving said teeth opposite to said axial movement to return the teeth to their initial position for again entering said given region.

References Cited

UNITED STATES PATENTS

| 1,525,071 | 2/1925 | Cumfer | 156—207 |
| 1,804,661 | 5/1931 | Wagner | 156—591 |
| 2,553,054 | 5/1951 | Lincoln et al. | 156—197 |
| 2,604,984 | 7/1952 | Apgar | 206—46 |
| 2,609,314 | 9/1952 | Engel | 156—595 X |

EARL M. BERGERT, Primary Examiner

H. F. EPSTEIN, Assistant Examiner

U.S. Cl. X.R.

29—430, 455; 72—362; 83—10; 156—591; 264—160, 286, 295